United States Patent [19]

Matsuzaki et al.

[11] Patent Number: 4,887,152

[45] Date of Patent: Dec. 12, 1989

[54] MESSAGE DELIVERY SYSTEM OPERABLE IN AN OVERRIDE MODE UPON RECEPTION OF A COMMAND SIGNAL

[75] Inventors: Atsushi Matsuzaki; Hiroyuki Kobayashi, both of Kanagawa; Hideo Tomita, Chiba; Kenichi Kikuchi, Tokyo; Kenji Inoue; Yoshiyuki Kondo, both of Tokyo; Masatoshi Hirayasu, Kanagawa; Atsushi Ichise, Tokyo, all of Japan

[73] Assignee: Sony Corporation, Tokyo, Japan

[21] Appl. No.: 148,695

[22] Filed: Jan. 26, 1988

[30] Foreign Application Priority Data

Jan. 30, 1987 [JP] Japan .................................. 62-19982
Feb. 2, 1987 [JP] Japan .................................. 62-22071
Feb. 25, 1987 [JP] Japan .................................. 62-42305

[51] Int. Cl.⁴ ........................ H04N 5/00; H04N 7/18; H04B 3/50
[52] U.S. Cl. ..................................... 358/86; 358/93; 358/254; 340/825.08; 340/825.22; 340/825.28; 455/5; 455/31
[58] Field of Search ...................... 340/825.29, 825.52, 340/825.06, 825.07, 825.08, 825.17, 825.22, 825.28; 358/86, 93, 108, 254, 255; 297/146, 161, 191; 455/3, 4, 5, 6, 31, 32

[56] References Cited

U.S. PATENT DOCUMENTS

| | | |
|---|---|---|
| 3,602,891 | 8/1971 | Clark et al. . |
| 3,757,225 | 9/1973 | Ulicki . |
| 3,997,718 | 12/1976 | Ricketts et al. . |
| 4,247,106 | 1/1981 | Jeffers et al. . |
| 4,428,078 | 1/1984 | Kuo . |
| 4,513,315 | 4/1985 | Dekker et al. . |
| 4,521,021 | 6/1985 | Dixon . |
| 4,554,579 | 11/1985 | Citta . |
| 4,573,072 | 2/1986 | Freeman ............................... 358/86 |
| 4,584,603 | 4/1986 | Harrison . |
| 4,591,906 | 5/1986 | Morales-Garza et al. . |
| 4,647,980 | 3/1987 | Steventon et al. . |
| 4,684,981 | 8/1987 | Toyoshima et al. . |

FOREIGN PATENT DOCUMENTS

| | | |
|---|---|---|
| 103438 | 3/1984 | European Pat. Off. . |
| 144770A | 6/1985 | European Pat. Off. . |
| 54-105499 | 7/1979 | Japan . |
| 57-199369 | 12/1982 | Japan . |
| 59-15387 | 1/1984 | Japan . |
| 59-15388 | 1/1984 | Japan . |

OTHER PUBLICATIONS

"Design Technique for Multiplexing Asynchronous Digital Video and Audio Signal", by J. H. Stott, IEEE Transactions on Communications, vol. COM-26, No. 5, May 1987.
Boeing Electronics Company Brochure Entitled, "Putting the Future of Passenger Services and Entertainment at your Fingertips", 1987, Six Pages.
Boeing, "Proceedings of the SCAR Conference-Part 2", Mar. 1977, pp. 854 and 864.

Primary Examiner—Tommy P. Chin
Attorney, Agent, or Firm—Limbach, Limbach & Sutton

[57] ABSTRACT

An information transmission system for transmitting signals from a transmitting side through a single transmission line to a plurality of terminal units. When the terminal units are interrupted by a command signal from the transmitting side, transmission of ordinary information signals to the terminal units is inhibited. When the terminal units are released from the interrupt mode, transmission of ordinary information signals automatically resumes, so that the ordinary information signals are reproduced from the point in time point at which they were interrupted. Normal operation of the terminal units is partially or totally inhibited during the interrupt mode. The system may be embodied in a passenger vehicle, in which a terminal unit is provided at each of a plurality of passenger seats.

31 Claims, 9 Drawing Sheets

SELECTION & DISPLAY APPARATUS

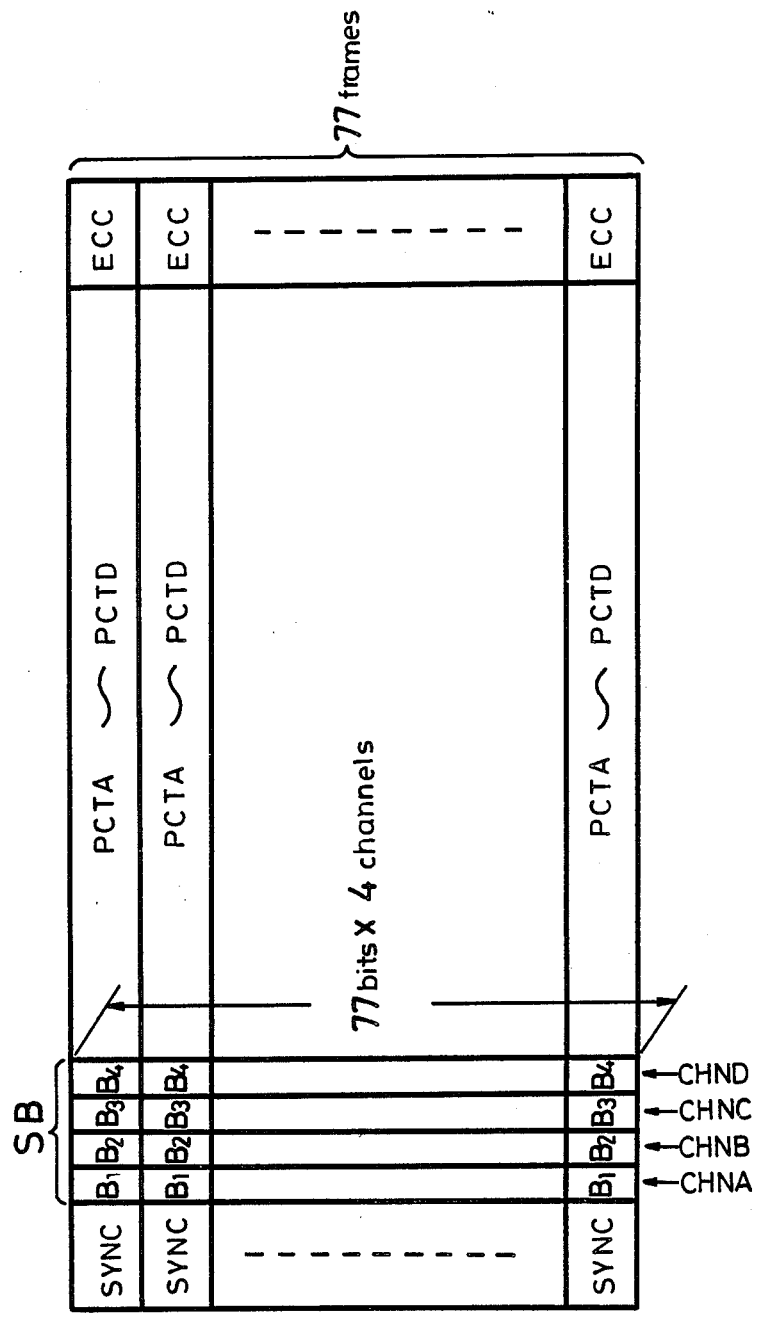

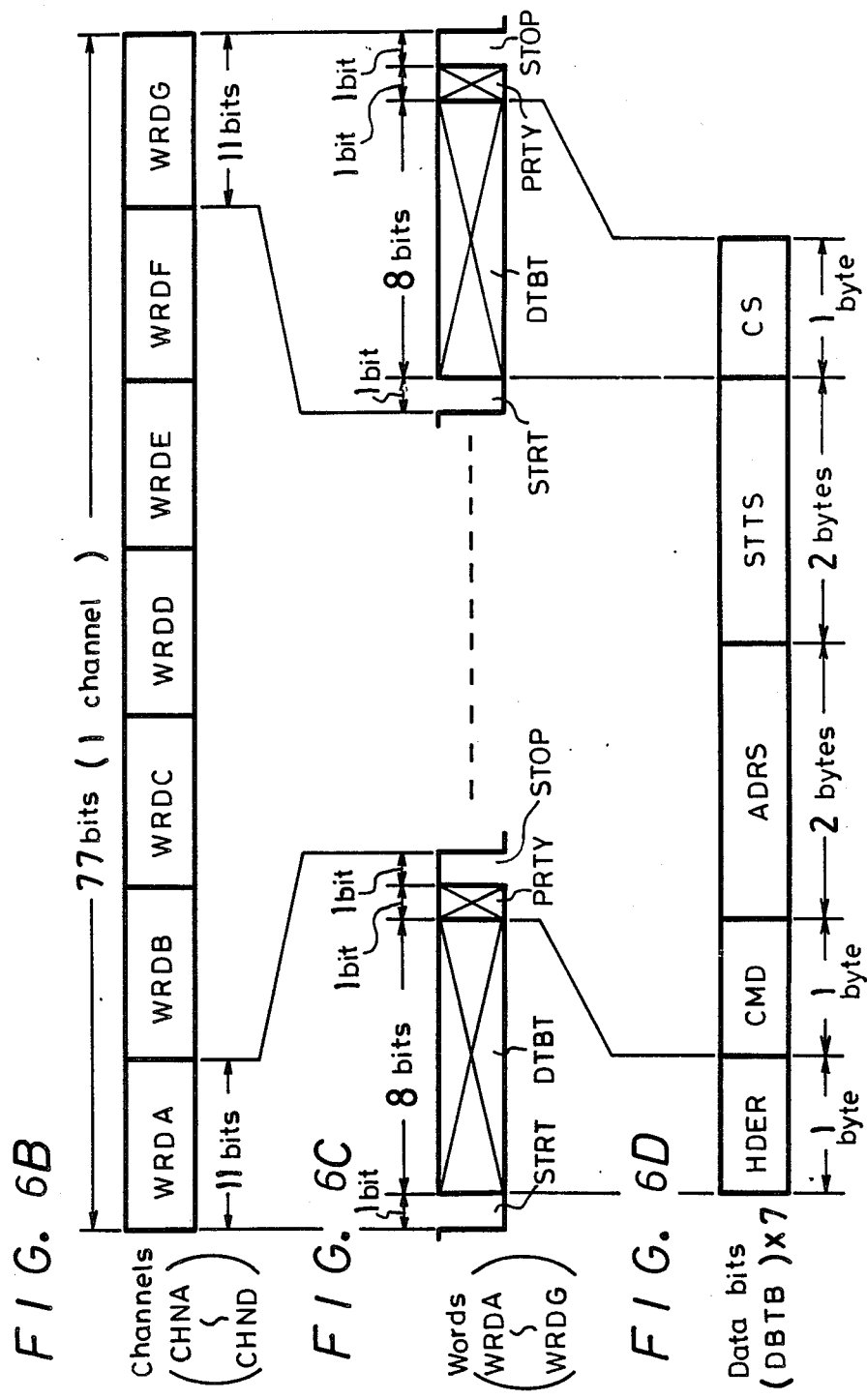

FIG. 7A

FASTEN
SEAT
BELTS

FIG. 7B

NO SMOKING

FIG. 7C

CUSTOM AND
IMMIGRATION
FORMS
TUNE CH.5 FOR
INFORMATION

MESSAGE DELIVERY SYSTEM OPERABLE IN AN OVERRIDE MODE UPON RECEPTION OF A COMMAND SIGNAL

FIELD OF THE INVENTION

This invention relates to an information transmission system capable of transmitting in parallel a plurality of video signals, audio signals, and other signals between a central unit and a plurality of terminal units each provided at a different passenger seat in a passenger vehicle, or at a different seat in a stadium, theater, or the like. More particularly, the invention relates to a forced transmission of messages in an override mode in a system of the type described in the preceding sentence.

BACKGROUND OF THE INVENTION

Aircraft are conventionally provided with an audio/video system to entertain passengers during flights of long duration. Conventional aircraft are further provided with a reading light and an attendant call light for each passenger seat.

However, in conventional aircraft and other passenger vehicles, routine announcements such as explanations regarding the manner in which life-jackets are to be used and so on, are provided only at predetermined times, e.g. before a movie is started or the like.

Further, if an announcement is made (for example in the event of an emergency) while a movie is being shown, some passengers may miss the announcement while observing the movie.

U.S. Pat. No. 4,584,603, issued Apr. 22, 1986 to Harrison discloses provision of a video display individually on the back of each seat in an aircraft. However, U.S. Pat. No. 4,584,603 fails to disclose an override operation for displaying messages or announcements at each video display.

SUMMARY OF THE INVENTION

The invention is a message delivery system for transmitting signals to a plurality of terminal units which solves the above-mentioned problems In a preferred embodiment in which each terminal unit is located at a different passenger seat in a passenger vehicle, the invention comprises:

(a) a head end apparatus comprising means for reproducing video programs, means for reproducing audio programs, means for reproducing messages, controller means having key means for generating a command signal for the messages, modulator means for modulating the video programs, the messages, the audio programs, and the command signal, in different frequency bands, respectively, and multiplexer means for multiplexing the modulated video programs, audio programs, messages and command signal;

(b) a plurality of terminal units each comprising a tuner means for receiving and demodulating the video programs, the audio programs, the messages and the command signal, a decoder means for decoding the command signal and generating in response to the command signal an override signal for forcing the tuner means to select the frequency band of the messages, a display means, an audio output terminal, a volume control, and a means for selecting the video programs and the audio programs; and (c) means for transmitting the video programs, the audio programs, the messages and the command signal from the head end apparatus to the terminal units.

These and other feature and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 5A-5C and 6A-6D are diagrams showing signal formats used in the invention;

FIGS. 7A-7C are diagrams showing examples of messages of the type displayed by the invention.

DESCRIPTION OF THE PREFERRED EMBODIMENTS

An embodiment of a message delivery system according to the present invention will hereinafter be explained with reference to FIG. 1. The embodiment of FIG. 1 is adapted for the transmission of messages, video signals, audio signals, and other signals in an aircraft.

The "transmitting side" (also referred to as the "central control portion" or "central control unit") of invention will first be described with reference to FIG. 1.

Figure 1:
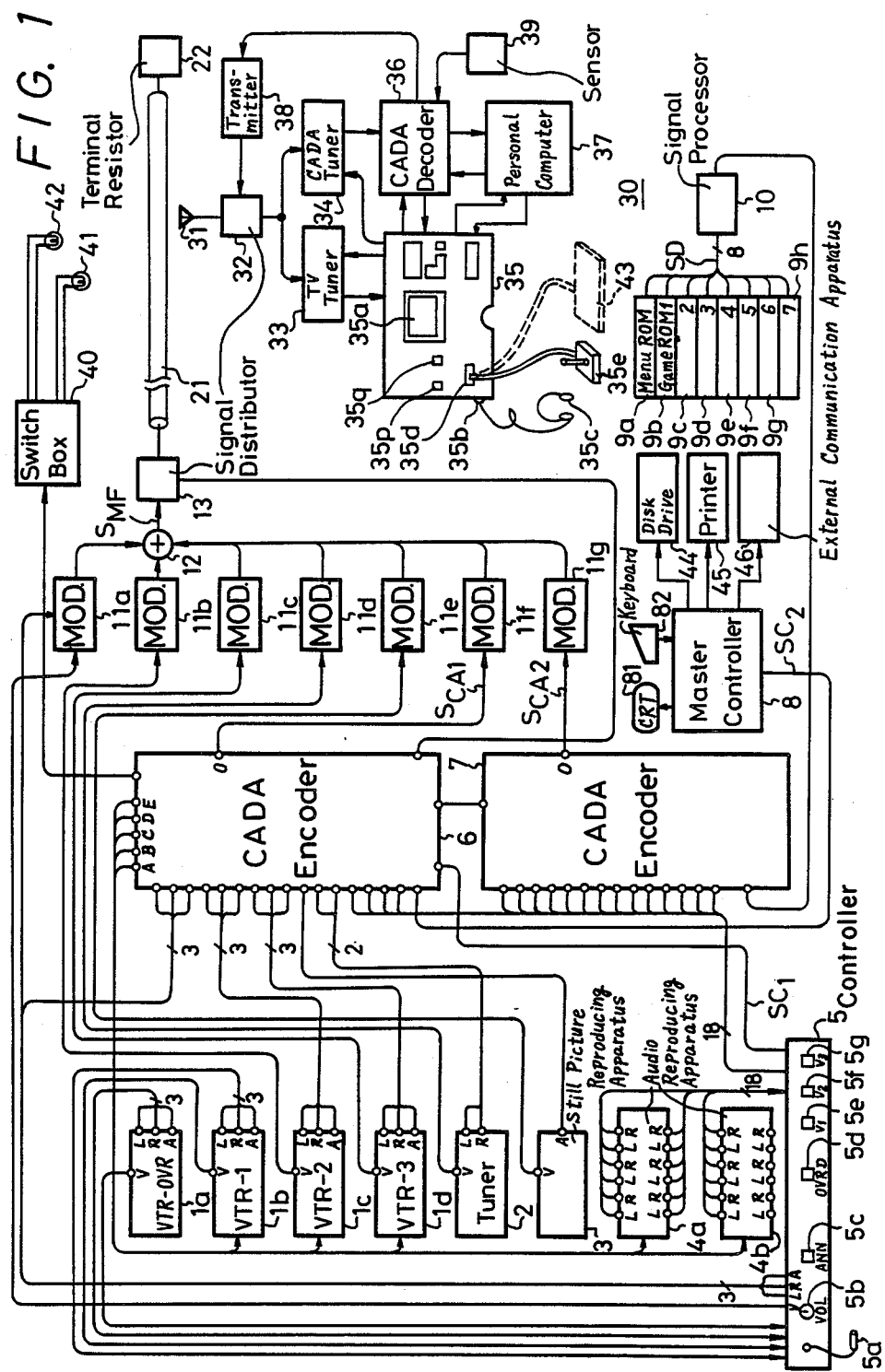
FIG. 1 is a block diagram showing a preferred embodiment of a message delivery system according to the present invention.

In FIG. 1, reference numerals 1a to 1d designate video tape recorders provided in the transmitting side such as in an aircraft crew's room. Video tape recorder 1a is used for an override operation and may be loaded with a cassette tape explaining how to put on a life-jacket or the like. Each of video tape recorders 1b to 1d is loaded with a cassette tape of a video program such as a movie. Each of video tape recorders 1a to 1d is respectively provided with a terminal V for outputting a reproduced video signal and with terminals L, R and A for outputting reproduced audio signals. In an embodiment in which video tape recorders 1a to 1d store bi-lingual programs, terminals L and R are used for outputting left-channel and right-channel audio signals in a first language, respectively, and terminal A is used for outputting a monaural audio signal in a second language.

Television tuner 2 is provided with a terminal V for outputting a video signal and terminals L and R for outputting the left and right channels of an audio signal, respectively.

Still picture reproducing apparatus 3 is capable of reproducing still picture information recorded in a compact disk (CD) ROM, such as maps, an airport guiding drawing, or the like. The still picture reproducing apparatus 3 is provided with a terminal V for outputting a video signal representative of a still picture and a terminal A for outputting an audio signal associated with the still picture.

Audio reproducing apparatus 4a and audio reproducing apparatus 4b each include three sets of compact disk players (CD players) and tape recorders. The audio reproducing apparatus 4a, 4b are respectively provided with six pairs of terminals L and R for outputting left channel and right channel audio signals.

Controller 5 comprises a microphone 5a, a volume control 5b for adjusting the level of an audio signal received at the microphone 5a, an announce key 5c, an override key 5d and pause keys 5e to 5g for setting the video tape recorders 1b to 1d into a pause or stop mode. Video signals from the respective terminals V of the video tape recorders 1a, 1b and audio signals from the respective terminals L, R and A of these recorders are supplied to controller 5. Controller 5 is provided with a terminal V for outputting a video signal and terminals L, R and A for outputting audio signals. Usually, the terminals V, L, R and A of the controller 5 output the video signal supplied from terminal V of the video tape recorder 1b and the audio signals supplied from terminals L, R and A of video tape recorder 1b. However, when the override key 5d is pressed to trigger the override operation, the terminals V, L, R and A of the controller 5 output the video signal supplied from terminal V of video tape recorder 1a and audio signals supplied from terminals L, R and A of video tape recorder 1a. When the announce key 5c is pressed to initiate the announce operation, an audio signal from microphone 5a is delivered to the output terminal A of controller 5.

CADA encoders 6 and 7 are of the type used in the conventional cable digital audio/data transmission system (CADA system) disclosed in U.S. Pat. No. 4,684,981 issued Aug. 4, 1987. The CADA encoders are capable of time-division-multiplexing a plurality of digital audio and data signals and transmitting the multiplexed signals over a vacant one channel band width (6 MHz) of a CATV, thus transmitting signals (e.g., music) with high efficiency without damaging their quality. Each of CADA encoders 6 and 7 is provided with an A/D (analog-to-digital) converter and a shift register. The time-division-multiplexing operation is carried out by converting a plurality of audio signals into digital signals in the A/D converter, inputting the digital signals in parallel to the shift register at predetermined locations, and then outputting the digital signals from the shift register in series at a high speed. Not only digital audio signals but also control data and data comprising computer software can be multiplexed by the CADA encoders in this manner.

The audio signals delivered to the output terminals L, R and A of controller 5 are supplied to encoder 6. The audio signals delivered to the output terminals L, R and A of the video tape recorders 1c and 1d are also supplied to encoder 6. The audio signals delivered to the output terminals L and R of the tuner 2 and the output terminal A of the still picture reproducing apparatus 3 are also supplied to encoder 6. The audio signals delivered to the six pairs of output terminals L and R of audio reproducing apparatus 4a and the six pairs of output terminals L and R of audio reproducing apparatus 4b are supplied to encoders 6 and 7 through controller 5.

When one of the override key 5d, the announce key 5c, and the pause keys 5e to 5g of the controller 5 is pressed, the controller 5 generates control data $SC_1$ having contents corresponding to the pressed key. The control data $SC_1$ is supplied to the encoder 6.

Encoder 6 has output terminals A to E from each of which a pause or stop control signal is outputted in response to the control data $SC_1$. The video tape recorders 1b to 1d and the audio reproducing apparatus 4a and 4b are respectively controlled by the pause or stop signals delivered from the terminals A to E of the encoder 6. More specifically, when the override key 5d and the announce key 5c are pressed, the pause control signal is outputted from all of the terminals A to E, so that the video tape recorders 1b to 1d and the audio reproducing apparatus 4a and 4b all enter a pause or stop mode. When the pause keys 5e to 5g are pressed, pause or stop control signals are outputted from output terminals A to C, placing the video tape recorders 1b to 1d into a pause or stop mode, respectively.

A master controller 8 is provided. Master controller 8 comprises a computer which controls the overall system, and is preferably located in the cabin of the aircraft. Master controller 8 is connected with a display 81 and a keyboard 82. Master controller 8 generates control data $SC_2$ (for controlling one or more terminal apparatus units located in the receiving side of the system) in response to a command from keyboard 82 and supplies control data $SC_2$ to encoder 6. The control data $SC_2$ may be, for example, data for controlling the luminance of a display in the terminal apparatus, data for polling the conditions of each passenger seat at which a terminal apparatus is located, or other data. The data can be monitored by the display 81 connected to the master controller 8.

Menu data is written in ROM 9a, and a different set of game data is written in each of ROMs 9b to 9h. Each data signal SD read out from the ROMs 9a to 9h (for example, for use with computer software) is supplied to a signal processing circuit 10 in which, for example, an error correcting code may be added thereto, and is supplied to encoder 7 thereafter.

Control data signals $SC_1$ and $SC_2$ are supplied also to the encoder 7 from the encoder 6.

A time-division-multiplexed signal $S_{CA1}$ emerges from output terminal 0 of encoder 6. Signal $S_{CA1}$ includes the plurality of digitally converted audio signals generated in encoder 6, and the control data $SC_1$ and $SC_2$ supplied to encoder 6. The signal $S_{CA1}$ is supplied to a modulator 11f to be amplitude-modulated, preferably by a VSB (vestigial sideband) system.

A time-division-multiplexed signal $S_{CA2}$ emerges from an output terminal 0 of the encoder 7. Signal $S_{CA2}$ includes the plurality of digitally converted audio signals generated in encoder 7, and the control data ($SC_1$ and $SC_2$) and the signal SD supplied to encoder 7. The signal $S_{CA2}$ is supplied to modulator 11g to be amplitude-modulated, preferably by a VSB system.

The video signal delivered to the output terminal V of controller 5 is supplied to modulator 11a. The audio signal delivered to the terminal A of controller 5 is supplied both to modulator 11a and to encoder 6. In modulator 11a, an ordinary television signal is generated by frequency modulating the audio signal and frequency-multiplexing the frequency modulated audio signal with the video signal. This television signal is thereafter amplitude-modulated, preferably by a VSB system.

The video signals delivered to the respective output terminals V of the video tape recorders 1c, 1d, the tuner 2, and the still picture reproducing apparatus 3 are respectively supplied to modulators 11b to 11e to be amplitude-modulated, preferably by a VSB system.

The modulators 11a to 11g modulate the signals supplied thereto in frequency bands chosen so as to prevent cross modulation, such as in every other channel above the 60 channels of the television broadcasting band.

Output signals from the modulators 11a to 11g are supplied to an adder 12 in which they are frequency-multiplexed. The frequency-multiplexed signal $S_{MF}$ from the adder 12 is supplied through a signal distributor 13 to one end of a leaky cable 21. Cable 21 serves as a bi-directional signal transmission means. The other end of leaky cable 21 terminates at terminal resistor 22. A coaxial cable whose periphery is spirally indented so as to leak a large amount of signals is suitable for use as cable 21.

The receiving side of the system of the invention will next be described.

FIG. 1 shows terminal apparatus unit 30, of the type that preferably will be mounted on the back of a plurality of passenger seats in an aircraft. Although only one terminal apparatus unit 30 is illustrated in FIG. 1, preferably there will be the same number of terminal units 30 as there are passenger seats in the aircraft. Each terminal apparatus 30 is provided with an antenna 31 which receives the frequency multiplexed signal $S_{MF}$ leaking from the leaky cable 21. The frequency-multiplexed signal $S_{MF}$ received at the antenna 31 is supplied through a signal distributor 32 to a television tuner 33 and a CADA tuner 34. Tuner 33 is capable of selectively receiving channels in the output frequency bands of the modulators 11a to 11e, while the tuner 34 is capable of selectively receiving channels in the output frequency bands of the modulators 11f and 11g. Tuners 33 and 34 are controlled in their channel selections by a selection and display apparatus 35.

Video and audio signals emerging from tuner 33 are supplied to the selection and display apparatus 35, and the time-division-multiplexed signal $S_{CA1}$ or $S_{CA2}$ emerging from tuner 34 is supplied to a CADA decoder 36. The CADA decoder 36 is constructed so as to effect substantially the inverse operations to those performed in CADA encoders 6 and 7. More specifically, CADA decoder 36 decodes the time-division-multiplexed signal $S_{CA1}$ (or $S_{CA2}$) or CADA data, produces a desired demultiplexed signal, and supplies the same to selection and display apparatus 35 or personal computer 37. Decoder 36 is provided with a shift register and a D/A converter. The time-division-multiplexed signals $S_{CA1}$ and $S_{CA2}$ are serially input to the shift register. The control data $SC_1$ or $SC_2$ is extracted in parallel form at a predetermined location in the shift register. The desired audio signal and computer software data signal SD are also extracted in parallel form at predetermined locations in the shift register, in response to control signals from selection and display apparatus 35. The audio signal is converted into an analog signal by the D/A converter. Decoder 36 requires a pair of D/A converters for the left channel and right channel of a stereo audio signal. The audio signals emerging from decoder 36 are supplied to selection and display apparatus 35. The computer software data SD is supplied to personal computer 37 and written into a random access memory (RAM) therein. An embodiment of decoder 36 is described in above-referenced U.S. Pat. No. 4,684,981.

Figure 2:
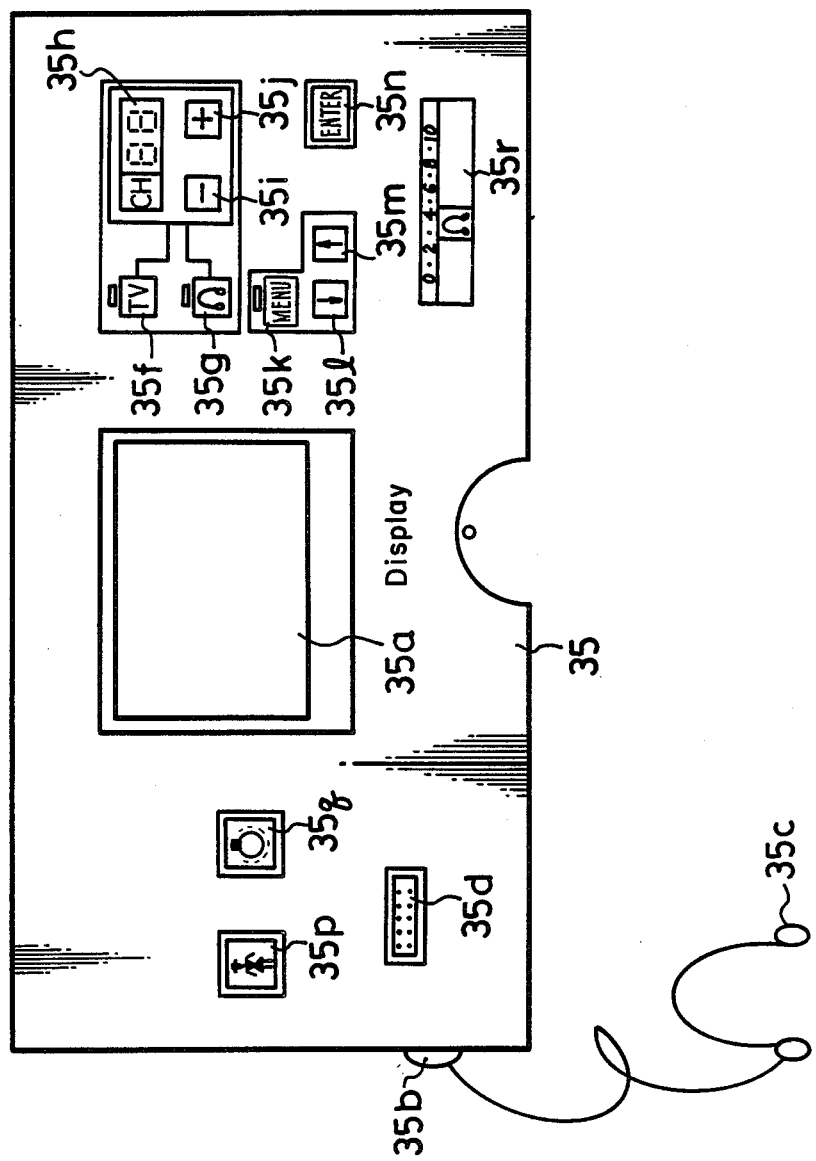
FIG. 2 is a plan view showing a panel of the selection indicating apparatus appearing in FIG. 1.
Figure 3:
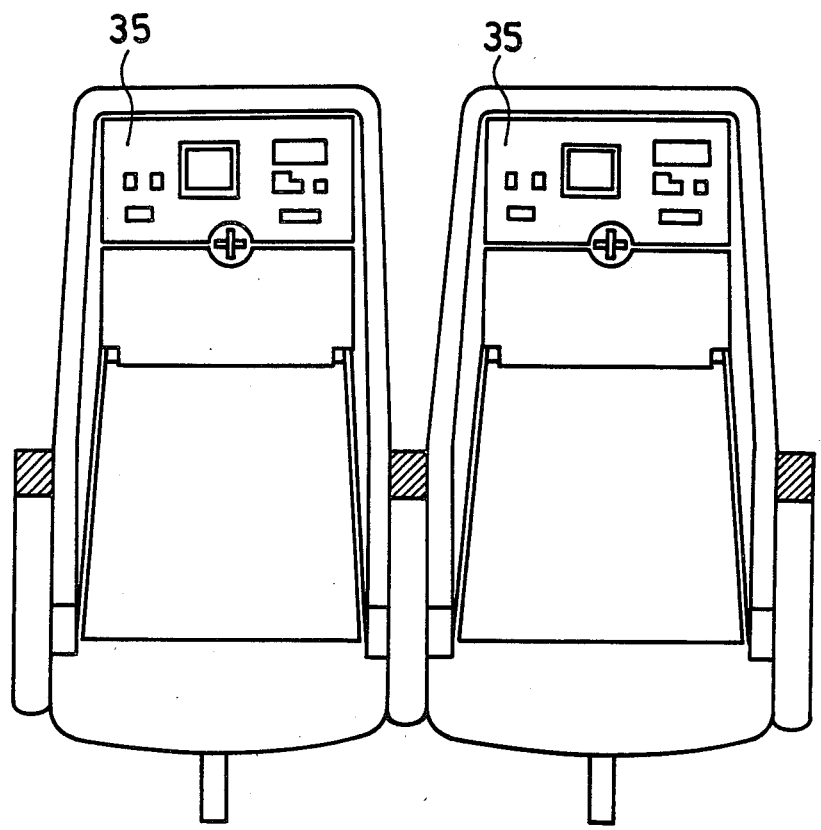
FIG. 3 is a view of two units of the selection indicating apparatus of the invention, each attached to the back of a passenger seat.

FIG. 2 is an example of a preferred arrangement of the panel of selection and display apparatus 35. The panel of selection and display apparatus 35 may be mounted on the back of a passenger seat, as shown in FIG. 3.

FIG. 2 shows a display 35a, which may comprise a flat cathode ray tube or an LCD (liquid crystal display) or the like, an audio output terminal 35b for connecting a pair of head phones 35c thereto, and a game terminal 35d for connecting a joy stick 35e (shown in FIG. 1), a keyboard 43 (indicated by dashed lines in FIG. 1), or the like for playing games.

Further, the selection and display apparatus 35 is provided with a television selecting key 35f, a music selecting key 35g, a channel display 35h, a channel-down key 35i a channel-up key 35j.

The television channel can be sequentially changed by first pressing the television selecting key 35f and then pressing the channel-down key 35i or the channel-up key 35j. Thus, when the channel received by the television tuner 33 is changed sequentially, the display 35a sequentially displays images reproduced from the video signals derived from the video tape recorders 1b to 1d, the tuner 2 and the still picture reproducing apparatus 3, and corresponding audio signals from CADA decoder 36 are outputted to the audio output terminal 35b. When the audio signal is bi-lingual, two audio channels are assigned for one video display. A first language is outputted from the first channel; and a second language from the second channel.

The music channel can be sequentially changed by first pressing the music selecting key 35g and then pressing the channel-down key 35i or the channel-up key 35j. In this manner, the audio signal outputted from the CADA decoder 36 is changed, and the audio signals outputted from the audio reproducing apparatus 4a and 4b are sequentially outputted to the audio signal output terminal 35b.

The selection and display apparatus 35 is also provided with a menu display key 35k, a cursor-down key 35l, a cursor-up key 35m and an enter key 35n. By pressing the menu key 35k, a video signal based on data from the menu ROM 9a is supplied to the selection and display apparatus 35 from the personal computer 37 and a menu is displayed on the display 35a.

By pressing the enter key 35n after selecting a game by moving the cursor on the display with the cursor-down key 35l and the cursor-up key 35m, a video signal and an audio signal based on data of the selected game from the game ROMs 9b to 9h are supplied from the personal computer 37 to the selection and display apparatus 35. Then, the game is displayed on the display 35a and the game sound signal is outputted to the audio output terminal 35b.

Selection and display apparatus 35 also includes an attendant call key 35p, a reading light key 35q and a volume control 35r.

Selection and display apparatus 35 (also referred to herein as "selection indicating apparatus 35") is controlled by a CPU (not shown) in CADA decoder 36 on the basis of the control data $SC_1$, $SC_2$ extracted by CADA decoder 36.

If override key 5d of controller 5 is pressed to initiate an override operation while passengers are watching a movie on the display 35a or listening to music, tuner 33 is forced to receive the frequency channel having the output frequency band of modulator 11a, display 35a of selection indicating apparatus 35 is forced to display an image reproduced from the video signal outputted to terminal V of video tape recorder 1a, and audio output terminal 35b is forced to output the audio signal supplied to output terminal A of video tape recorder 1a.

When announce key 5c of controller 5 is pressed to initiate an announce operation, tuner 33 is forced to receive the frequency channel having the output frequency band of modulator 11a, and audio output terminal 35b is forced to output the audio signal from microphone 5a. In this event, the video signal is muted so that display 35a does not display any image. Further, any one of the television selecting key 35f, the music selecting key 35g, the channel-down key 35i, the channel-up key 35j and the volume adjuster 35r, or all of them are disabled (prohibited from operating). Additionally, the volume to all terminal units may be caused to be uniform.

When CADA encoder 6 or 7 ceases to function, due to a malfunction for example, the control data $SC_1$ supplied to selection indicating apparatus 35 is the same as that indicating initiation of an override operation, so that the selection indicating apparatus 35 is forced into the same mode of operation as in the override mode.

When an override operation is effected while a passenger is playing a game on terminal display 35a, personal computer 37 is temporarily prohibited from executing the game. Also in this case, all or some of the functions of unit 35 may be disabled, such as channel selection and volume adjustment by television selecting key 35f, music selecting key 35g and so on.

When the override key 5d or the announce key 5c is pressed again to terminate the override operation or the announce operation, selection and display apparatus 35 is released from the override condition and automatically returned to its condition as of initiation of the override or announce operation. More specifically, video tape recorders 1b-1d and audio reproducers 4a and 4b are automatically released from the pause or stop state and set into the reproducing mode. The terminal units 30 are also returned to their selected conditions as of the initiation of the override or announce operation, so that reproduction of the video signal and the audio signal resumes from the respective interrupted points. Thus, the passengers can view a complete movie or listen to musical program without missing any scene of the movie or any part of the music. If the override or announcement operation had interrupted a game, personal computer 37 resumes its execution, so that play of the game may resume.

When the selection state is overriden (forced into a condition) as described above, channel display 35h displays a signal indicative of the forced condition. Selection and display apparatus 35 may optionally include an additional display for this indication.

The luminance of display 35a is automatically controlled in accordance with the luminance of the passenger's cabin in response to control data $SC_2$. When the control data $SC_2$ requests transmission of data from one or more units 35, the CPU within the CADA decoder 36 of each relevant unit 35 generates data indicative of a condition of the associated one of units 35 or data detected by sensor 39 (such as data indicating whether the seat belt is fastened and whether the seat is reclined, or the like). The requested data is supplied to transmitter 38 to be modulated to a frequency outside the frequency bands of modulators 11a through 11g. Then, the modulated data is supplied through signal distributor 32 and antenna 31 to leaky cable 21. The data is next supplied from leaky cable 21 through signal distributor 13 to CADA encoder 6 from which the data is supplied to master controller 8 to be utilized.

When attendant call key 35p on selection indicating apparatus 35 is pressed, control data is generated from the CPU in the associated CADA decoder 36. This control data is supplied to transmitter 38 to be modulated and is thereafter supplied through signal distributor 32 and antenna 31 to leaky cable 21. Then, the data is supplied from leaky cable 21 through signal distributor 13 to CADA encoder 6. A CPU (not shown) within CADA encoder 6 controls a switching box 40 on the basis of the data received from cable 21 so as to light the corresponding attendant call lamp 41.

When reading light key 35q on selection indicating apparatus 35 is pressed, control data is generated from the CPU in the associated CADA decoder 36. This control data is supplied to transmitter 38 to be modulated and thereafter supplied through signal distributor 32 and antenna 31 to leaky cable 21. Then, the data is supplied from leaky cable 21 through signal distributor 13 to CADA encoder 6. The CPU within CADA encoder 6 controls switching box 40 on the basis of the data received from cable 21 so as to turn on or off a corresponding reading lamp 42.

When keyboard 43 is connected to game terminal 35d, as shown by dashed lines in FIG. 1, the CPU in the CADA decoder 36 generates control data. This control data is supplied to transmitter 38 to be modulated and thereafter supplied through signal distributor 32 and antenna 31 to leaky cable 21. The data is next supplied from leaky cable 21 through signal distributor 13 to CADA encoder 6 from which the data is supplied to master controller 8. In response thereto, master controller 8 supplies encoders 6 and 7 with a computer program such as a word processor program. The program (which will hereinafter be referred to as a word processor program for specificity) is supplied through leaky cable 21 to terminal apparatus 30 as a frequency-multiplexed signal and is received by personal computer 37. When a passenger inputs sentences or the like from the keyboard 43, the sentences or the like are stored in a random access memory (RAM) in personal computer 37. Display 35a displays the inputted sentences or the like so that the passenger using the word processor can correct the sentences or the like while viewing them on display 35a. When an instruction indicating the termination of a word processing operation is entered using keyboard 43, data representing the sentences or the like (converted into ASCII code) stored in the RAM of personal computer 37 are supplied through CADA decoder 36 to transmitter 38 to be modulated and thereafter are supplied to leaky cable 21 through signal distributor 32 and antenna 31. Then, the data is supplied from leaky cable 21 through signal distributor 13 to CADA encoder 6 from which the data is supplied to master controller 8. The data representing the sentences or the like may be supplied from master controller 8 to disk drive 44 to be recorded e.g. in a floppy disk. Otherwise, the data is supplied to printer 45 which prints the sentences or the like, or to transmitter 46 to be transmitted to a remote location. The destination of the word processing data is selected by the user by entry of appropriate commands on keyboard 43. Data indicative of the selected destination is supplied to master controller 8 together with the word processing data itself. The word processor program may be previously written in the ROM provided in the personal computer 37 and then utilized. Any record generated at memory unit 44 and any printed record generated at printer 45 may be delivered to the passenger, such as when the passenger exits the aircraft.

Next, another preferred embodiment of a message delivery system according to the present invention will be described with reference to FIG. 4. The FIG. 4 system is constructed so as to be able to individually control the reception of each of the plurality of terminal units 30. The components in FIG. 4 corresponding to those in FIG. 1 are designated by the same reference numerals and the explanation thereof will be omitted.

Figure 4:
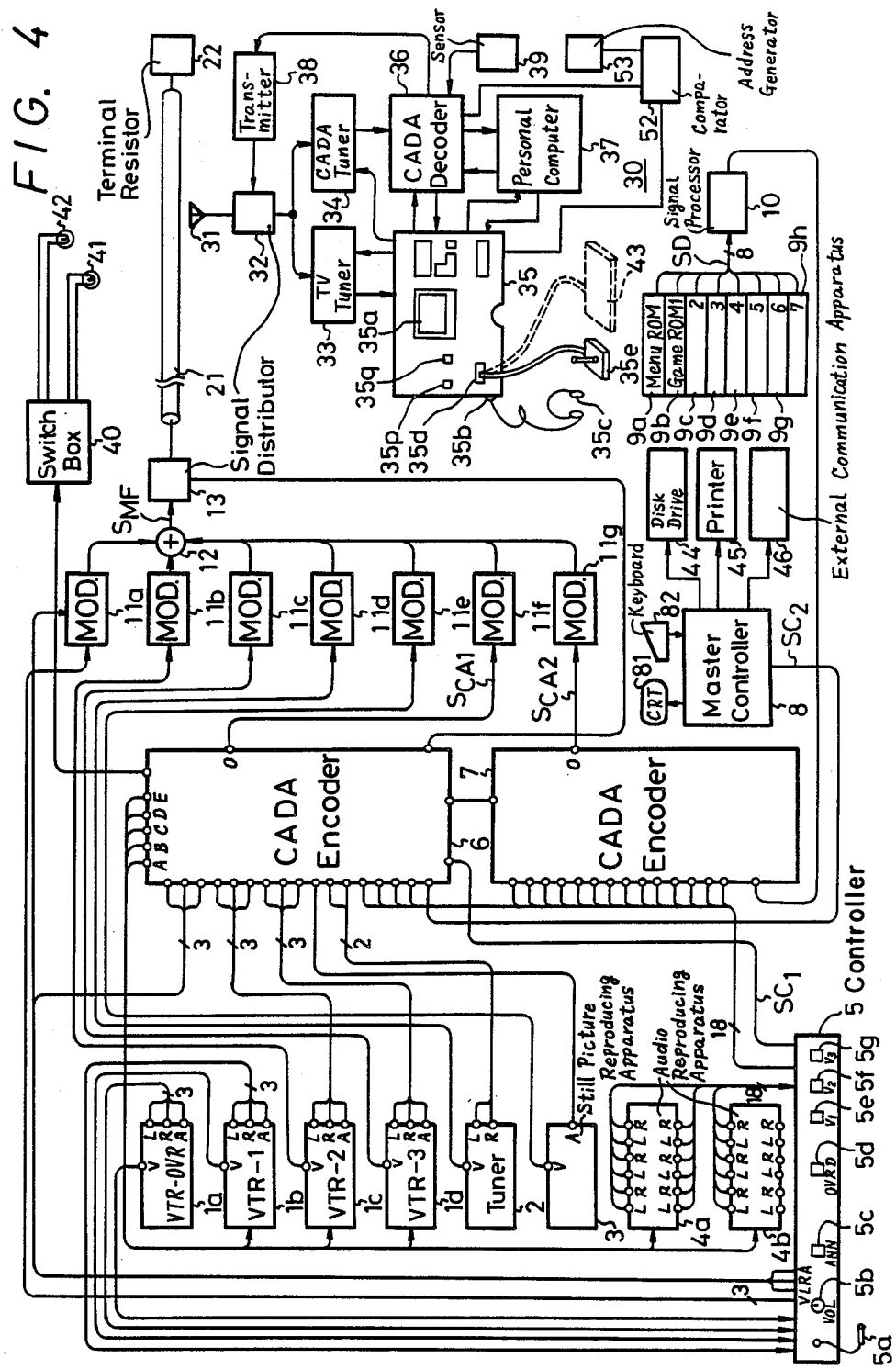
FIG. 4 is a block diagram of another preferred embodiment of the invention.

In the FIG. 4 embodiment, CADA encoder 6 generates an address signal corresponding to the terminal unit 30 which is to be controlled. The address is previously set by the master controller 8 by operating the key board 82 before the operation of the override key 5d or the announce key 5c. This address signal is multiplexed with the control data $SC_1$, $SC_2$ and supplied to the leaky cable 21 to be transmitted to the receiving side of the system.

The CADA decoder 36 in each terminal unit 30 extracts the address signal from the signals $S_{CA1}$, $S_{CA2}$ which are supplied from CADA tuner 34. The address signal extracted by each CADA decoder 36 is supplied to a comparator 52 wherein the extracted address signal is compared with an address signal, generated from an address generator 53 including a read-only memory (ROM) or the like provided in each terminal unit 30. The selection indicating apparatus 35 is controlled by an output signal from comparator 52. More specifically, only when the address signal extracted by the CADA decoder 36 coincides with the address signal from the address generator 53, is reception of the terminal unit 30 controlled by the control data $SC_1$ and $SC_2$ in the manner described above.

The rest of the FIG. 4 embodiment is constructed and arranged in the same manner as is the FIG. 1 embodiment.

In the FIG. 4 embodiment, each terminal apparatus 30 corresponding to the address signal transmitted from the transmitting side is solely controlled in reception by the control data $SC_1$ and $SC_2$. Therefore, the override, announcement, and other operations described above with reference to FIG. 1, may be directed to individual ones of the plurality of terminal units 30.

Next, signal formats of the signals $S_{CA1}$ and $S_{CA2}$ will be explained with reference to FIGS. 5A-5C. The signal format is improved from that disclosed in aforementioned U.S. Pat. No. 4,684,981.

Figures 5A, 5B, 5C:
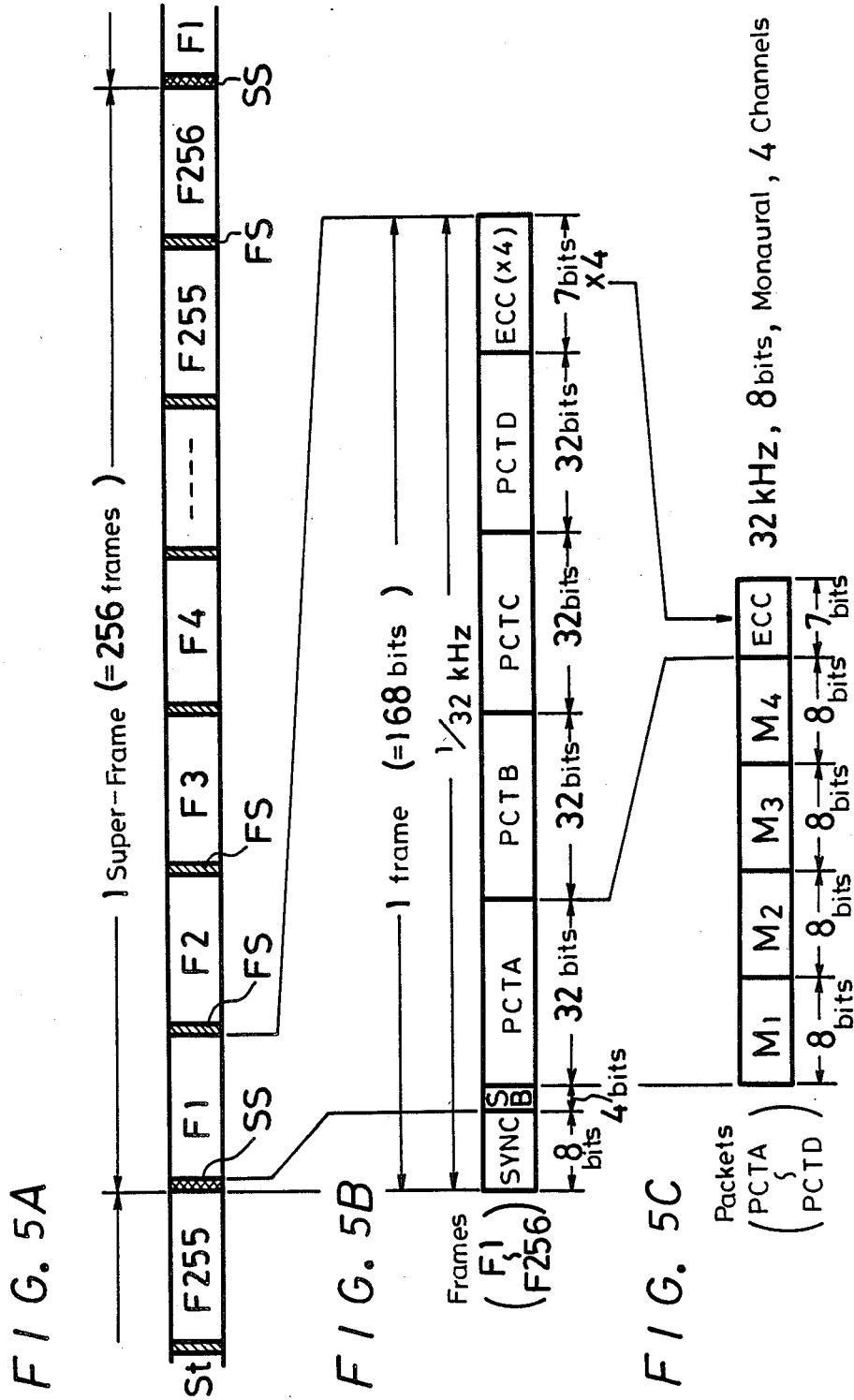

Multiplexed signal St shown in FIG. 5A, is a serial binary signal formed of a number of super-frames. One super-frame thereof is formed of 256 frames F1 through F256. As shown in FIG. 5B, each frame includes 168 bits and the cyclic period of one frame is $(32 \text{ kHz})^{-1}$. Each frame has an 8-bit synchronizing code SYNC, followed by a 4-bit service bit SB, followed by four 32-bit data packets PCTA-PCTD, followed by four 7-bit error correcting codes (ECCs).

There are two kinds of synchronizing code SYNC as shown in FIG. 5A: a super-frame-sync SS for the frame F1 at the head of the super-frame and a frame-sync FS for the subsequent 255 frames F2-F256. The bit patterns of super-frame-sync SS and frame-sync FS are selected to differ from each other.

The service bits SB, the details of which will be provided below, are grouped into four groups each including 77 bits. Each service bit contains data such as a command, a seat number, and so on.

Each of data packets PCTA-PCTD is formed of 32 bits and is independent of the others. As shown in FIG. 5C, each of the packets PCTA-PCTD is divided into four channels M1-M4, each being formed of 8 bits. Each of the channels M1-M4 contains a PCM signal obtained by sampling the audio signals L, R and A at a frequency of 32 kHz.

Since one frame contains four packets PCTA-PCTD and each packet has four channels M1-M4, 16-channel audio signals can be simultaneously transmitted in time-division multiplexed form by the use of one signal St. Each channel is sampled at a sampling frequency of 32 kHz and encoded in 8 bits, so that it complies with the PCM audio standard of an 8 mm video tape recorder (VTR).

Data signals from the ROMs 9a-9h are converted into a time-division multiplexed bit sequence signal by signal processing circuit 10 (shown in FIG. 4). The time-division multiplexed signal emerging from circuit 10 is used as one channel of the 16-channel signals. The signal emerging from circuit 10 is cyclic, so that when the last bit of data from ROMs 9a-9h is transmitted, the first bit of the data from these ROM's is retransmitted.

Each channel of the FIG. 5C signal is formed of eight bits, and eight ROMs 9a-9h are provided. Accordingly, in the channel for transmitting data from the ROMs 9a-9h, each of the first bit through the eighth bit of the channel corresponds to data from a different one of ROMs 9a through ROM 9h. Therefore, the transmission rate of data from each ROM is 32 kbps.

The four error correcting codes ECCs respectively correct errors which may occur in the packets PCTA-PCTD.

Since the signal St has format determined as described above, the bit transmission rate thereof is calculated as follows:

$$168 \text{ bits} \times 32 \text{ kHz} \approx 5.4 \text{ Mbps.}$$

One half of the calculated value is the Nyquist frequency, so that the signal St can be transmitted in a video signal bandwidth.

As described above, each of the encoders 6 and 7 can time-division-multiplex sixteen channels of audio signals, and the time division-multiplexed signal can be frequency-multiplexed with other video signals.

The service bits SB are preferably used in groups having a format as shown in FIGS. 6A-6D. To be specific, four service bits SB are provided for every frame, and may be designated $B_1$-$B_4$. Assuming that continuous 77 frames are vertically aligned as one group, as schematically shown in FIG. 6A, the service bits SB for this group have a dimension of vertical 77 bits $\times$ horizontal 4 bits.

As shown in FIG. 6B, the service bits SB may be vertically grouped so that each set of 77 bits is designated as one channel. A first such channel CHNA includes 77 bits $B_1$ and second—fourth such channels CHNB-CHND include bits $B_2$s-$B_4$s, respectively.

Each of the channels CHNA-CHND is divided into seven words WRDA-WRDG, each being formed of 11 bits as shown in FIG. 6B. Each word has its first bit set to "0" level and used as a start bit STRT, the subsequent eight bits are used as data bits DTBT, the next one bit used as a parity bit PRTY, and the last one bit determined to be "0" level and used as a stop bit STOP, as shown in FIG. 6C.

There is one data bit DTBT for each word in each of the channels CHNA-CHND, and there are seven words for each 77 frames. Therefore, there are seven data bits (seven bytes) for the 77 frames. Accordingly, there are 7 bytes×4 channels of the data bits DTBTs in all.

The second channel CHNB has its first byte set in a predetermined bit pattern ("AA" in hexadecimal) and is used as a header HDER, its second byte is used as a command CMD for identifying a maximum of 256 kinds of commands, the third and fourth bytes are used as an address ADRS indicative of a seat number (or a number of identifying a particular terminal unit), the fifth and sixth bytes are used as status information STTS indicative of data or parameters incident to the command CMD, and the last byte used as a check sum CS.

The command CMD of FIG. 6D represents control data $SC_1$ or $SC_2$ from controller 5 and master controller 8. For example, when a terminal unit is forced into the message receiving state, the control data $SC_2$ for this operation is generated from master controller 8 by operating center keyboard 82 and is transmitted as a command CMD of a signal having FIG. 6D format.

The address ADRS is arbitrarily changed by the operation of center keyboard 82, so that any of or all of the terminal units may be specified.

FIGS. 7A-7C are examples of messages which are supplied during an override operation from video tape recorder 1a shown in FIGS. 1 and 4. Alternatively, an override message may be a moving picture showing how to put on a life-jacket and so on.

Figure 8:
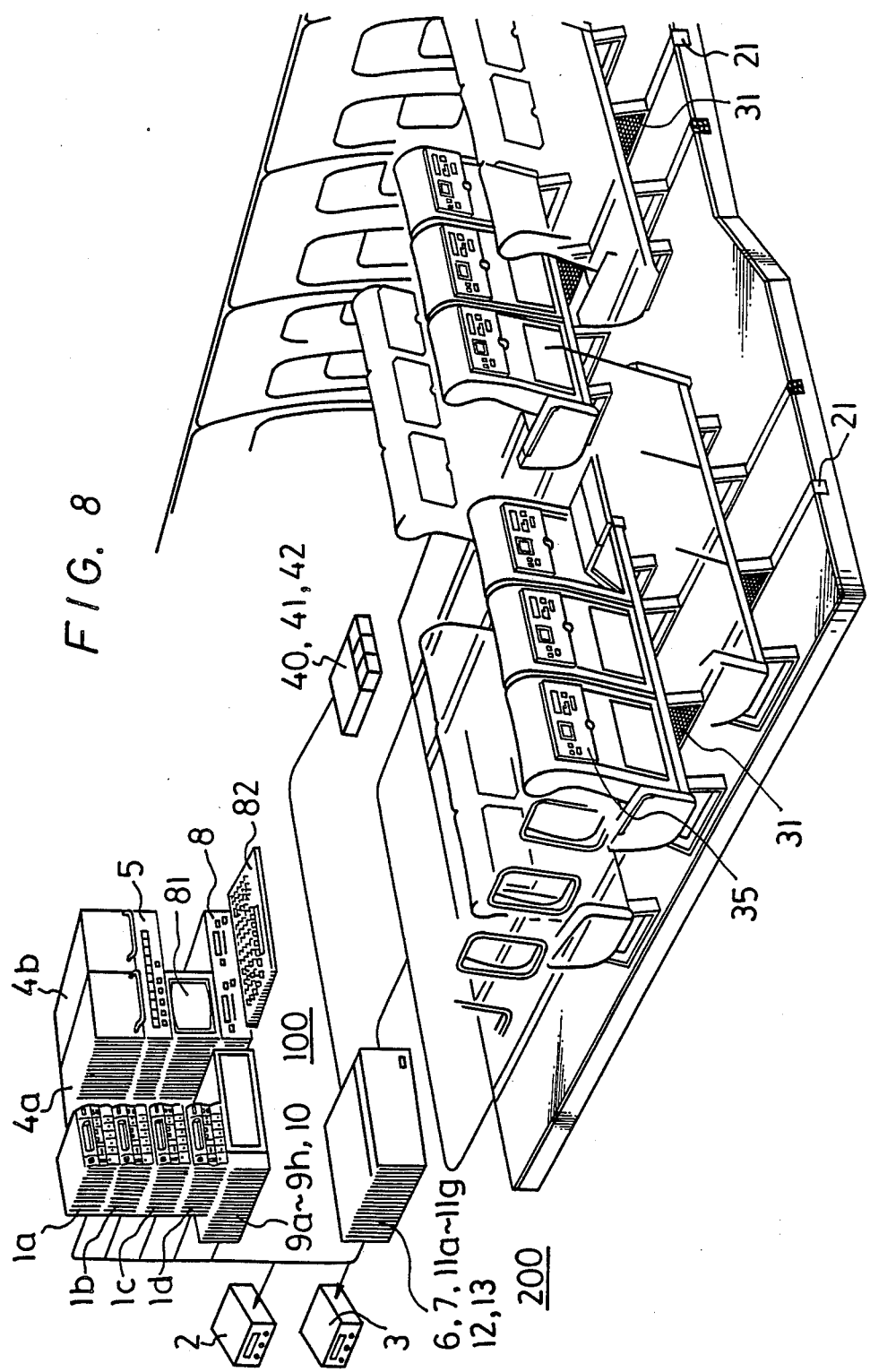
FIG. 8 is a perspective view of a preferred embodiment of the invention.

FIG. 8 shows a preferred embodiment of the invention which is installed in a cabin of an aircraft. The components in FIG. 8 corresponding to those in FIGS. 1 and 4 are designated by the same reference numerals. Disk drive 44, printer 45 and external communication apparatus 46 are omitted in FIG. 8 for simplicity. ROMs 9a-9h and signal processing circuit 10 in FIGS. 1 and 4 are accommodated in box 100, and CADA encoders 6 and 7, modulators 11a-11g, adder 12 and signal distributor 3 are accommodated in box 200.

The above embodiments have been described for the case where the invention is embodied in an aircraft. The invention may also be implemented in a vehicle such as a train, a bus or the like, or may be implemented to provide communication between a central unit and a terminal unit at each of a plurality of seats in a stadium, a theater, or the like.

In the above-described embodiments, each selection and display apparatus 35 is arranged on the back of a passenger seat. Alternatively, each unit 35 can be mounted at the vicinity of the seat, for example, on the arm portion of the seat, on a table attached to the seat or the like. Further, in one variation, only the display 35a is arranged on the back of a seat, while other components of unit 35 are arranged on the arm portion of the seat.

According to the present invention, when the announce or override operation is effected, one or more terminal units 30 are interrupted by the command signal $SC_1$ indicative of this operation and forced to receive and reproduce the announce or override signal. Therefore, the passengers will never miss the audio and visual signals transmitted during the announce or override operation.

The components 1b-1d, 4a, and 4b are forced into a pause or stop state during the announce or override operation, and when the announce or override operation is terminated, the pause or stop mode of operation of each of components 1b-1d, 4a and 4b, is terminated and the reproducing mode is resumed. At this time, each terminal unit 30 also is returned to its reproducing mode and may resume reproduction of the video signal V and the audio signals L, R, A from the point in time that the reproduction was interrupted by the announce or override operation so that the signals are not skipped and the passengers can view a complete video program or listen to a complete audio program without missing any part thereof.

Since each terminal apparatus 30 is partially or totally prohibited from selection and operation during the announce and override operations, the passengers never miss the message.

Although several preferred embodiments of the invention have been described, it will be apparent that many modifications and variations on the described embodiments could be effected by one skilled in the art without departing from the spirit or scope of the invention, as claimed below.

We claim as our invention:

1. A message delivery system, comprising:
   (a) a head end apparatus comprising means for reproducing video programs, means for reproducing audio programs, means for reproducing messages, controller means having key means for generating a command signal for said messages, modulator means for modulating said video programs, said messages, and said audio programs and said command signal in different frequency bands, respectively, and multiplexer means for multiplexing said modulated video programs, said modulated messages, said modulated audio programs and said modulated command signal;
   (b) a plurality of terminal units each comprising a means for selecting desired ones of said multiplexed, modulated video programs and audio programs, tuner means coupled to the selecting means for receiving and demodulating said modulated messages, said selected modulated video programs, said selected modulated audio programs, and said modulated command signal, a means for receiving the demodulated command signal and generating in response to the demodulated command signal an override signal for forcing the tuner means to select the frequency band of said modulated messages, a display means for displaying the demodulated selected video programs, an audio output terminal for receiving the demodulated selected audio programs, and a volume control for controlling the amplitude of the demodulated selected audio programs received by the audio output terminal; and
   (c) means for transmitting said video programs, said messages, said audio programs and said command signal from said head end apparatus to the terminal units.

2. A message delivery system according to claim 1, in which said messages are video messages and said messages are displayed on said display means.

3. A message delivery system according to claim 1, in which said messages include video messages and audio messages and said video messages are displayed on said display means and said audio messages are received by said audio output terminal.

4. A message delivery system according to claim 1, in which said controller means generates pause or stop signals for said video program reproducing means and said audio program reproducing means when said key means is operated to generate the command signal.

5. A message delivery system according to claim 4, in which said controller means generates pause release signals for said video program reproducing means and said audio program reproducing means when said key means is operated again.

6. A message delivery system according to claim 5, in which operation of said selecting means is inhibited by said command signal.

7. A message delivery system according to claim 6, in which operation of said volume control is inhibited by said command signal.

8. A message delivery system according to claim 1, in which said head end apparatus further comprises a microphone connected to said control means, said key means includes an announce key, and voice signals obtained from said microphone are modulated in the modulator means when said announce key is actuated.

9. A message delivery system according to claim 8, in which a display generated at the display means is blanked when said announce key is actuated.

10. A message delivery system according to claim 8, in which said head end apparatus further comprises memory means for storing television game software signals, said modulator is capable of modulating said television game software signals, said multiplexer means is capable of multiplexing the modulated television game software signals, and each terminal unit further comprises a means for selecting desired ones of said television game software signals and a processor means for processing the selected television game software signals.

11. A message delivery system according to claim 8, in which said head end apparatus further comprises an encoder means for digitally encoding an audio signal related to each video program, an audio program unrelated to a video program, and said command signal, in which said modulator means modulates the output of said encoder means in a different frequency band from that of said video programs, and in which said tuner means includes a first tuner for receiving and demodulating said video programs and said messages and a second tuner for receiving and demodulating said encoded audio signal, said encoded audio program, and said encoded command signal, wherein each of the terminal units includes a decoder means for receiving and decoding the output of said second tuner, and wherein said override signal forces said first tuner to select the frequency band of said messages when said demodulated command signal is received.

12. A message delivery system according to claim 11, in which said head end apparatus further comprises memory means for storing television game software signals, said decoder means decodes said television game software signals in addition to said audio signal, said audio program, and said command signal, and each of the terminal units further comprises a means for selecting desired ones of said television game software signals and a processor means for processing the selected television game software signals, said processor means being connected to said decoder means in such a manner that the decoder means decodes the selected television game software signals and supplies the decoded, selected signals to the processor means.

13. A message delivery system according to claim 12, in which said controller means generates pause or stop signals for said video program reproducing means and said audio program reproducing means when said key means is operated to generate the command signal.

14. A message delivery system according to claim 13, in which operation of said video program and audio program selecting means and operation of said processor means is inhibited by said command signal.

15. A message delivery system according to claim 14, in which operation of said volume control is inhibited by said command signal.

16. A message delivery system according to claim 1, in which said command signal includes at least one address signal, wherein each said address signal identifies one of said terminal units, wherein each of the terminal units further comprises means for processing the command signal to determine whether the command signal includes said at least one address signal identifying said each of the terminal units, and in which only those terminal units identified by an address signal in the command signal are forced to receive said messages.

17. A message delivery system according to claim 1, in which each terminal unit serves a different passenger seat in a passenger vehicle.

18. A message delivery system according to claim 17, in which said passenger vehicle is an aircraft.

19. A message delivery system, comprising:
(a) a head end apparatus comprising means for generating video and related audio signals, means for generating separate audio signals, means for generating override video signals, means for generating an override command signal, encoder means for encoding said audio signals and said override command signal, a modulator means for modulating said video signals, said override video signals, and the encoded audio and override command signals emerging from said encoder means, and a multiplexer means connected to said modulator means for multiplexing said modulated video signals, all of said modulated, encoded audio signals, said modulated override video signals, and said modulated, encoded override command signal;
(b) a plurality of terminal units, each comprising a selecting means for selecting any desired one of said modulated video and related modulated, encoded audio signals, and said separate modulated, encoded audio signals, a first tuner for receiving and demodulating said selected modulated video signals and said modulated override video signals, a second tuner for receiving and demodulating said selected modulated, encoded audio signals and said modulated, encoded override command signal, each of the first tuner and the second tuner being coupled to the selecting means, a decoder means for decoding the output signal of said second tuner, a display means for displaying said selected, demodulated video signals and said demodulated override video signals, an audio output terminal for receiving said selected, demodulated, decoded audio signals, and a volume control for controlling the amplitude of the selected, demodulated, decoded audio signals received by the audio output terminal, wherein said first tuner is forced to receive said modulated override video signals when said demodulated override command signal is decoded; and
(c) means for transmitting multiplexed signals generated by the multiplexer means from the head end apparatus to each of the terminal units.

20. A message delivery system according to claim 19, in which said head end apparatus further comprises memory means for storing television game software signals, said encoder means is capable of encoding said television game software signals, said modulator means is also capable of modulating said encoded television game software signals, said multiplexer means is capable of multiplexing the modulated, encoded television game software signals with the modulated video signals, the modulated, encoded audio signals, the modulated override video signals, and the modulated, encoded override command signals, the selecting means is capable of selecting desired ones of said modulated, encoded television game software signals, the second tuner is capable of receiving and demodulating the selected modulated, encoded television game software signals and supplying the selected demodulated, encoded television game software signals to the decoder means, and each of the terminal units further comprises a processor means coupled to the decoding means for receiving and processing the decoded selected television game software signals.

21. A message delivery system according to claim 20, in which said override video signal generating means further generates corresponding override audio signals, said encoder means encodes the override audio signals, and said decoder means selectively decodes said encoded override audio signals when said override command signal is decoded.

22. A message delivery system according to claim 21, in which said head end apparatus further comprises a microphone, and an announce key provided at said override command signal generating means, wherein the output signals of said microphone are encoded instead of said override audio signals when said announce key is operated, and said decoder means selectively decodes said output signal of said microphone when said override command signal is decoded by said decoder means.

23. A message delivery system according to claim 20, in which operation of said selecting means is inhibited when said override command signal is decoded by said decoder means.

24. A message delivery system according to claim 21, in which operation of said selecting means and said volume control are inhibited when said override command signal is decoded by said decoder means.

25. A message delivery system according to claim 22, in which operation of said selecting means and said volume control are inhibited when said override command signal is decoded by said decoder means.

26. A message delivery system according to claim 20, wherein each of the terminal units is positioned at a different passenger seat in a passenger vehicle.

27. A message delivery system, comprising:
a head end apparatus comprising means for reproducing video programs, means for reproducing messages, controller means for enabling and disabling said message reproducing means and for generating a command signal, and a pause or a stop signal for said video program reproducing means upon enablement of said message reproducing means, and multiplexer means for multiplexing said video programs, said messages and said command signal;
a plurality of terminal units, each comprising a means for selecting desired ones of said video programs, a tuner for receiving said selected video programs, said messages, and said command signal, means for displaying said selected video programs and said messages, and means for forcing said tuner to receive said messages in response to reception of the command signal; and
means for transmitting said multiplexed video programs, said multiplexed messages and said multiplexed command signal from said head end apparatus to each of the terminal units.

28. A message delivery system according to claim 27, in which said selecting means is inhibited when said command signal is received.

29. A message delivery system according to claim 27, in which said controller means generates pause release signals for said video programs reproducing means when said message reproducing means is disabled by said controller means.

30. A message delivery system according to claim 27, in which said head end apparatus further comprises a microphone for delivering oral messages, wherein said multiplexer means multiplexes said oral messages with said video programs, said messages and said command signal, wherein each of the terminal units includes an audio output terminal for receiving said oral messages, wherein said command signal forces said tuner to receive said oral messages an said command signal forces the terminal unit to supply said received oral messages to said audio output terminal.

31. A message delivery system according to claim 27, wherein each of the terminal units is positioned at a different passenger seat in a passenger vehicle.

* * * * *